W. L. MONTGOMERY.
AUTOMATIC DEVICE FOR RECEIVING AND DISCHARGING CARTONS.
APPLICATION FILED SEPT. 18, 1912.
1,077,092.
Patented Oct. 28, 1913.
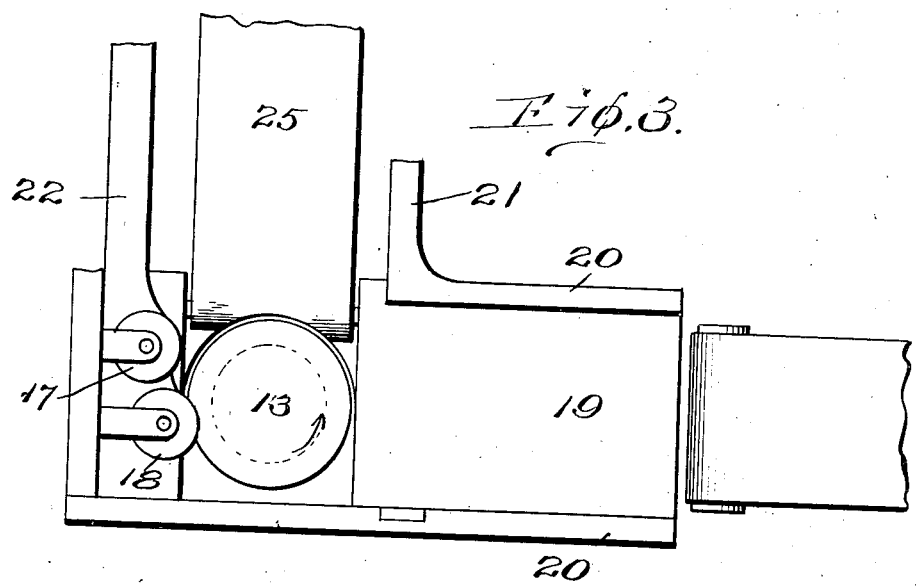
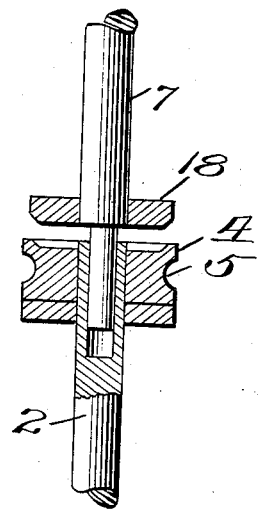

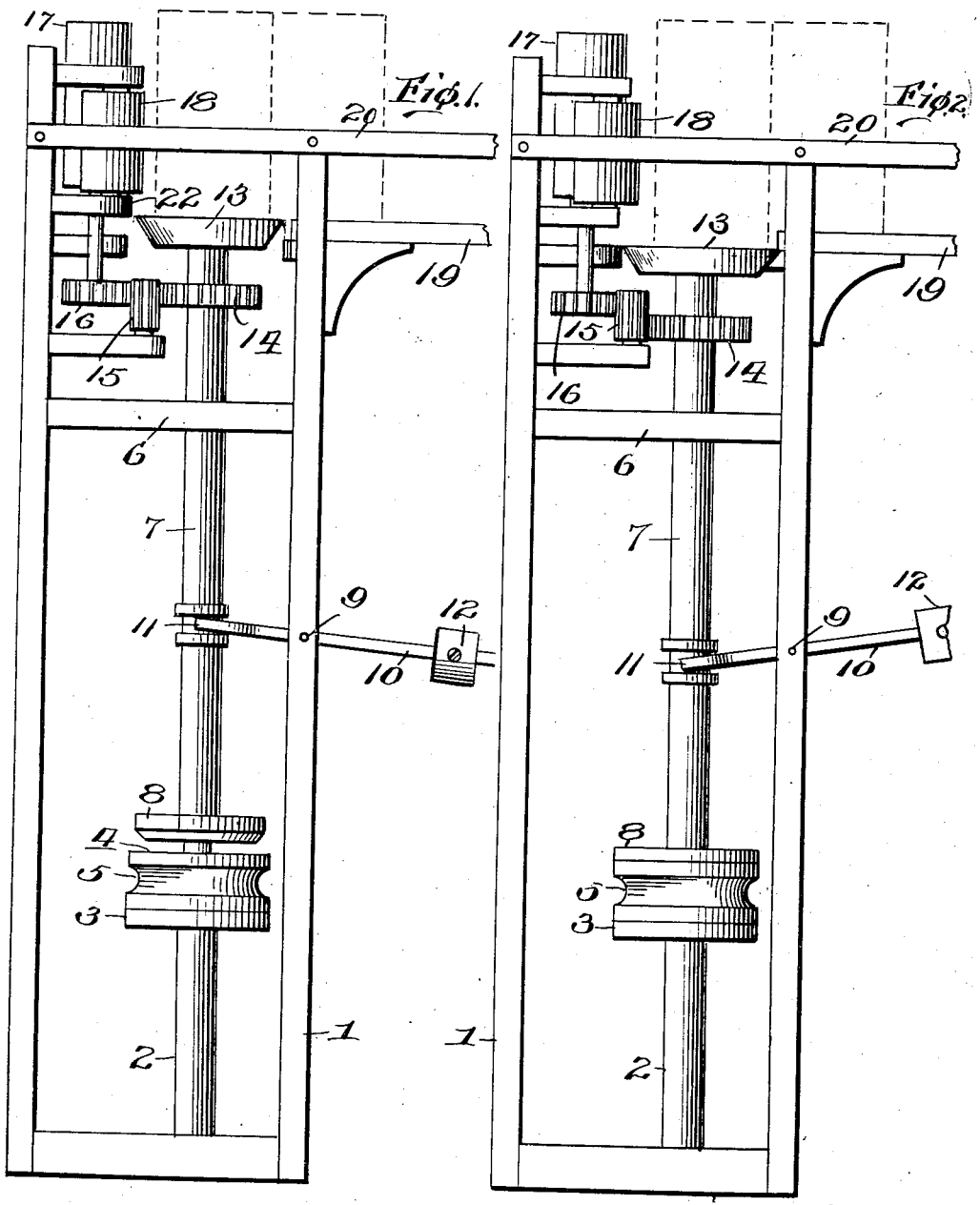

UNITED STATES PATENT OFFICE.

WALTER L. MONTGOMERY, OF CHICAGO, ILLINOIS.

AUTOMATIC DEVICE FOR RECEIVING AND DISCHARGING CARTONS.

1,077,092.  Specification of Letters Patent.  Patented Oct. 28, 1913.

Application filed September 18, 1912. Serial No. 721,097.

*To all whom it may concern:*

Be it known that I, WALTER L. MONTGOMERY, citizen of the United States, residing at Chicago, in the county of Cook and State of Illinois, have invented certain new and useful Improvements in Automatic Devices for Receiving and Discharging Cartons; and I do hereby declare the following to be a full, clear, and exact description of the invention, such as will enable others skilled in the art to which it appertains to make and use the same.

This invention relates to improvements in a receiving and discharging mechanism, associated with an automatic weighing and filling machine, and one of the objects of the invention is to provide a receiving and discharging mechanism automatically thrown into operation by the weight of the filled container.

A further object of the invention is to assist the discharge mechanism in removing the filled container from the platform of the discharge mechanism, such assisting means being in operation only when the container is full.

With these and other objects in view the invention comprises certain novel constructions, combinations and arrangement of parts as will be hereinafter more fully described and claimed.

Figure 1 is a side elevation of the mechanism in raised position, the containers being shown in dotted lines. Fig. 2 is a view similar to Fig. 1 with the delivering mechanism thrown into operation. Fig. 3 is a top plan view of the delivering mechanism, and Fig. 4 is a fragmentary, vertical section of the clutch mechanism.

Like characters of reference designate corresponding parts throughout the several views.

The mechanism disclosed in this invention is designed to be placed between the bottom sealing machine and the top sealing machine and placed directly under the weighing and filling machine.

Generally the invention resides in a vertically revoluble platform suitably balanced, the said platform being depressed by the weight of a filled container, which automatically throws it in gear for rotating the platform which discharges the package to a moving conveyer belt.

Referring more specifically to the drawings 1 represents the frame of the machine which may be rigidly secured in any suitable manner directly under a filling and weighing machine, and adjacent to a moving receiving conveyer belt for delivering empty containers to the filling and weighing machine, and also adjacent to a moving discharging conveyer belt for delivering containers when filled from a circular rotary platform to a top sealing machine, the discharging conveyer belt being located at right angles with the receiving conveyer belt.

Rigidly secured to the frame 1 is a vertical tubular member 2 carrying at the upper end thereof a collar 3 which supports a normally rotating clutch member 4, which is provided with a groove 5 for receiving a belt for driving the same. The upper part of the frame 1 is provided with a cross brace 6 through which passes a shaft 7 carrying at the lower end a clutch member 8 adapted to engage the inner surface of the clutch member 4 when the shaft 7 descends. The lower end of the shaft member is reduced and passes through the normally rotating clutch member 4 into a tubular member 2.

Pivoted in the frame 1 as at 9 is a lever 10, one end 11 of which is bifurcated and engages the shaft 7 between a pair of suitable collars, it being understood, however, that any other suitable means of connecting the lever 10 with the shaft 7 may be used. The other end of shaft 10 is adapted to receive an adjustable weight 12, this weight being such as to balance the weight of the shaft 7, the clutch member 8, and a circular platform 13 rigidly secured to the shaft 7. By means of this weight 12, the platform 13 is normally held in position as shown in Fig. 1.

Keyed to the shaft 7 is a suitable wheel 14 engaging an elongated pinion 15 in the frame 1, this pinion 15 being designed in turn to engage a gear wheel 16, which is secured by means of a shaft to a roller 17. The surface of this roller 17 may be covered with rubber or any other substances which will frictionally engage the sides of the containers to be delivered. Arranged in front of the roller 17 is a second roller 18. This roller 18 being placed somewhat nearer the platform 13 than the roller 17. By this mechanism it will be seen that the roller 17 will be turned through the medium of the gears whenever the shaft 17 is caused to rotate.

To one side of the platform 13 is formed a platform 19, the top of the platform 19 being level with the top of the platform 13 when the latter is in its raised position. As shown in Fig. 3, the platform 19 is arranged adjacent a suitable belt for carrying the empty containers from the bottom sealing machine to the platform 19. Arranged above and parallel to each side of the platform 19 is a pair of guides 20, the purpose of these guides being to form a restricted pathway through which the empty containers may pass to the platform 13.

Arranged beside a discharging conveyer belt 25 and extended backwardly therefrom is a guide bar 22, which with the guide bar 23 projecting from one of the guides 20 forms a pathway through which the filled containers may pass from the rotating circular platform 13 to the conveyer belt 25 leading to the top sealing machine. The edges of the rotating platform are beveled, as shown, the purpose of the bevel being to allow the top of the conveyer belt 25 to be as near as possible to the top of the platform 13 when the latter is in its lowest position.

In the operation of this mechanism, the empty containers are delivered to the stationary platform 19 when the rotary circular platform 13 is in its elevated position and the clutch member 8 is disengaged from the clutch member 4 through the medium of adjustable weight 12. As the empty container arrives upon the platform 13, the same is filled from a suitable weighing and filling machine indicated diagrammatically at 24. It is designed to have the shaft 7 so balanced with the adjustable weight 12 that when the container has been filled, the weight of the same will be sufficient to overcome the weight of the adjustable member 12 and the shaft 7 will descend, the clutch 8 engaging with the clutch member 4 which is normally rotating. The rotation of the clutch 8 by means of the clutch 4 will rotate the platform 13 in the direction indicated by the arrow, Fig. 3. The filled container, which has one side thereof in engagement with the roller 18 will slide along said roller and be thrown against the elongated roller 17. From the mechanism already described, it will be apparent that the roller 17 is also rotating, such rotating being simultaneous with the rotation of the shaft 7. It will be noted that by means of the intermediate gear 15, the shaft 17 is made to rotate in the same direction as the rotatable platform 13, so that as the filled container moves in the direction indicated by the arrow, the side which engages the shaft member 17 will be pushed along in the same direction as that shown by the arrow on the platform 13. The platform 13 and the roller 17 will rotate so long as the weight of the filled container is thrown upon the platform 13, and the belt 25 will engage the advancing end of the filled container before said carton has been completely removed from the platform 13. It will be noted that the guide rod 22 leads out from the roller 17, so that that edge of the filled container which engages the said roller will be guided along the guide rod 22 and be picked up by the conveyer belt 25. It may be noted that the two rollers 17 and 18 are mounted upon an extension of the guide rod 22, this extension being secured to the frame 1 in any suitable manner.

From this description, it will be apparent that an auxiliary mechanism is thrown into operation for delivering the container as soon as it is complete, and also an auxiliary friction roller is caused to operate at the same time, the direction of rotation of the roller being such as to assist the discharging of the filled container.

What is claimed is:

1. In a machine for receiving and discharging containers, a normally rotating member, a balanced rotatable platform mounted to move vertically, and means associated with the platform and moving therewith for engaging the rotating member as the platform descends, and a conveying device having its upper surface in the same plane with the platform when the latter is rotated.

2. In a machine for receiving and discharging containers, a balanced platform, a normally rotating member, and means moving with the platform for engaging the rotating member as the platform is lowered, and a conveying device having its upper surface in the same plane with the platform when the latter is rotated.

3. In a machine for receiving and discharging containers, a rotatable balanced platform adapted to move axially, a clutch member moving with the balanced platform, and a normally rotating clutch member adjacent the first mentioned clutch member, said clutches engaging as the balanced platform is moved toward the normally rotating clutch.

4. In a machine for receiving and discharging containers, a frame, a rotatable member guided in the frame, said member being adapted to reciprocate in the direction of the axis of rotation, adjustable means for balancing said reciprocable member, a normally rotating member, and means associated with the reciprocable member for engaging the rotating member as the said reciprocable member is moved downwardly.

5. In a machine for receiving and discharging containers, a frame, a tubular member associated with the frame, a normally rotating member supported at the top of the tubular member, a movable member guided in the frame and extending into the tube, means pivoted to the movable member for permitting the same to move toward the rotating member at a predetermined load, and a member secured to the movable member adjacent the rotating member for engaging the latter as the movable member moves.

6. In a machine for receiving and discharging containers, a frame, a rotatable balanced platform mounted to reciprocate in the frame, a stationary platform adjacent to the rotatable platform, the top of the platforms being at the same level when the balanced platform is in its normal position, means for rotating the balanced platform, and a conveyer belt mounted on the frame, the level of the top of said conveyer belt being that of the top of the movable platform when the latter is in its lowest position.

7. In a machine for receiving and discharging containers, a rotatable discharging platform movable vertically, an auxiliary friction cylinder mounted adjacent the rotatable platform, means for rotating the rotatable platform as the latter descends, and means for rotating the auxiliary cylinder in the same direction as the rotatable platform as the latter rotates.

8. In a machine for receiving and discharging containers, a platform rotating intermittently, a stationary platform level with the rotating platform, a rotatable friction cylinder adjacent the rotating platform at right angles to the plane of the rotatable platform, and mechanism associated with the cylinder and rotatable platform for rotating each in the same direction as the rotatable platform turns.

9. In a machine for receiving and discharging containers, a platform, a conveyer moving in a plane below that of the platform, a rotatable platform introduced between the platform and the conveyer and movable on a line at right angles to the plane of the conveyer, said rotatable platform being adapted to enter the plane with the conveyer when at one limit of its movement, and means to rotate the rotatable platform when out of the plane of the platform first mentioned.

In testimony whereof I affix my signature in presence of two witnesses.

WALTER L. MONTGOMERY.

Witnesses:
   JAY D. MILLER,
   RUFUS S. CAMPBELL.